United States Patent
Zhang et al.

(10) Patent No.: US 9,904,840 B2
(45) Date of Patent: Feb. 27, 2018

(54) FINGERPRINT RECOGNITION METHOD AND APPARATUS

(71) Applicant: Xiaomi Inc., Beijing (CN)

(72) Inventors: Tao Zhang, Beijing (CN); Pingze Wang, Beijing (CN); Shengkai Zhang, Beijing (CN)

(73) Assignee: Xiaomi Inc., Beijing (CN)

(*) Notice: Subject to any disclaimer, the term of this patent is extended or adjusted under 35 U.S.C. 154(b) by 0 days.

(21) Appl. No.: 15/222,107

(22) Filed: Jul. 28, 2016

(65) Prior Publication Data
US 2017/0124379 A1 May 4, 2017

(30) Foreign Application Priority Data
Oct. 28, 2015 (CN) .......................... 2015 1 0712896

(51) Int. Cl.
*G06K 9/00* (2006.01)
*G06K 9/62* (2006.01)

(52) U.S. Cl.
CPC ..... *G06K 9/00067* (2013.01); *G06K 9/00013* (2013.01); *G06K 9/6267* (2013.01)

(58) Field of Classification Search
CPC ............ G06K 9/6267; G06K 9/00013; G06K 9/00067
See application file for complete search history.

(56) References Cited

U.S. PATENT DOCUMENTS 6,005,643 A * 12/1999 Morimoto ............. G06T 1/0085
 375/240.26
6,069,914 A *  5/2000 Cox ....................... H04N 5/913
 375/130
(Continued)

FOREIGN PATENT DOCUMENTS

CN 102646190 A 8/2012
CN 102750528 A 10/2012
(Continued)

OTHER PUBLICATIONS

International Search Report dated Jul. 26, 2016 for International Application No. PCT/CN2015/099511, 5 pages.
(Continued)

*Primary Examiner* — Chan Park
*Assistant Examiner* — Mia M Thomas
(74) *Attorney, Agent, or Firm* — Brinks, Gilson & Lione

(57) ABSTRACT

A method for fingerprint recognition utilizes an auto encode decode network to perform feature extraction on a first fingerprint image acquired by a fingerprint sensor and a second fingerprint image retrieved from a database. First and second fingerprint features corresponding to the first and second fingerprint images are thus obtained. The first and second fingerprint features may have equal dimensionality. Dimensionality reduction may be performed on the first and second fingerprint features to respectively obtain third and fourth fingerprint features. The third and fourth fingerprint features may have equal dimensionality. A cosine distance between the third and fourth finger print features may determine whether the first fingerprint image and the second fingerprint image belong to a same fingerprint.

11 Claims, 7 Drawing Sheets

(56) References Cited

U.S. PATENT DOCUMENTS

| | | | |
|---|---|---|---|
| 6,373,970 B1* | 4/2002 | Dong | G06K 9/32 128/922 |
| 8,401,337 B2* | 3/2013 | Perlmutter | G06K 9/32 348/96 |
| 8,863,096 B1* | 10/2014 | Bucur | G06F 11/3604 717/124 |
| 2002/0138736 A1* | 9/2002 | Morin | H04N 21/23611 713/180 |
| 2003/0088531 A1 | 5/2003 | Nishi et al. | |
| 2003/0169910 A1 | 9/2003 | Reisman et al. | |
| 2004/0114822 A1* | 6/2004 | Tabesh | G06K 9/00221 382/248 |
| 2007/0160262 A1 | 7/2007 | Kim et al. | |
| 2013/0051607 A1 | 2/2013 | Highley | |
| 2014/0108020 A1* | 4/2014 | Sharma | G10L 19/018 704/500 |
| 2014/0142958 A1* | 5/2014 | Sharma | G10L 19/02 704/500 |
| 2014/0165097 A1* | 6/2014 | Chase | H04N 21/23424 725/36 |
| 2014/0193087 A1* | 7/2014 | Conwell | G06F 17/30265 382/224 |
| 2015/0125036 A1* | 5/2015 | Bilobrov | G06K 9/00067 382/103 |
| 2016/0243701 A1* | 8/2016 | Gildert | G05B 19/42 |
| 2016/0321494 A1* | 11/2016 | Shin | G06K 9/00013 |
| 2017/0004346 A1* | 1/2017 | Kim | G06F 17/30268 |
| 2017/0083742 A1* | 3/2017 | Lamare | G06T 7/97 |
| 2017/0133022 A1* | 5/2017 | Gurijala | G10L 19/018 |
| 2017/0140732 A1* | 5/2017 | Kim | G02B 5/08 |

FOREIGN PATENT DOCUMENTS

| | | |
|---|---|---|
| CN | 103324944 A | 9/2013 |
| CN | 103839041 A | 6/2014 |
| CN | 105354560 A | 2/2016 |
| JP | 10-177650 A | 6/1998 |
| JP | 2006-330873 A | 12/2006 |
| JP | 2008-521109 A | 6/2008 |
| JP | 2010-039778 A | 2/2010 |
| RU | 2 486 590 C1 | 6/2013 |

OTHER PUBLICATIONS

Anyonymous, "Autoencoder," Oct. 14, 2015, Wikipedia, printed from the internet at <https://en.wikipedia.org/w/index/.php?title=Autoencoder&oldid=685653941>, on Feb. 21, 2017, 3 pages.

English Translation of International Search Report dated Jul. 26, 2016 for International Application No. PCT/CN2015/099511, 4 pages.

Extended European Search Report dated Mar. 2, 2017 for European Application No. 16196099.2, 9 pages.

Ng, Adrew, "CS294A Lecture Notes—Sparse Autoencoder," Jan. 1, 2011, printed from the internet at <https://web.stanford.edu/class/cs294a/sparseAutoencoder_2011new.pdf>, on Feb. 21, 2017, pp. 1-19.

Wang, Ruxin et al., "Fingerprint Classification Based on Depth Neural Network," ArXiv, Sep. 18, 2014, 14 pages.

Wang, Yasi et al., "Dimensionality Reduction Strategy Based on Auto-encoder," Internet Multimedia Computing and Service, ACM, 2015, 4 pages.

Office Action dated Aug. 8, 2017 for Russian Application No. 2016129191/08, 12 pages.

Kazumasa, Hashimoto et al., "Application of Semi-supervised Recursive Auto Encoder to Texts in Biomedical Field," Proceedings of the 19th Annual Conference of the Linguistic Society of Japan, Japan, Linguistic Society of Japan, 2013, pp. 838-841.

Office Action dated Dec. 19, 2017 for Japanese Application No. 2017-547061, 4 pages.

Yamada, Michio et al., "On a High Efficient Data Compression for Fingerprint Image File by Extracting Significant Point in the Image," the Transactions of the Institute of Electronics, Information and Communication Engineers, Japan, The Institute of Electronics Information and Communication Engineers, vol. J76-D-II, No. 3, 1993, pp. 547-556.

* cited by examiner

FINGERPRINT RECOGNITION METHOD AND APPARATUS

CROSS-REFERENCE TO RELATED APPLICATIONS

This application is based on and claims priority to Chinese Patent Application No. 201510712896.0, filed on Oct. 28, 2015, the entire contents of which are incorporated herein by reference.

TECHNICAL FIELD

The present disclosure generally relates to the field of image recognition technologies, and more particularly, to a fingerprint recognition method and apparatus.

BACKGROUND

Fingerprint recognition has been studied since about 1980 and since at least 1990, it has been widely used as a mature technology in both civilian and military fields. In technologies related to fingerprint recognition, when a fingerprint is taken and is not too dry, a resulting fingerprint image may be clear enough, such that both global and local feature points may be extracted successfully. However, when a fingerprint image is poor in quality, the fingerprint recognition may be inaccurate because the recognition process may fail to recognize the global feature points and the local feature points. This problem may negatively affect a user's experience with a fingerprint recognition product.

SUMMARY

Embodiments of the present disclosure provide a fingerprint recognition method and apparatus for improving an accuracy rate of fingerprint recognition for low-quality fingerprint images.

According to a first aspect of the present disclosure, a fingerprint recognition method may include the following steps. Feature extraction may be performed on a first fingerprint image acquired by a fingerprint sensor and a second fingerprint image stored in a database. An auto encode decode network may be used to obtain a first fingerprint feature corresponding to the first fingerprint image and a second fingerprint feature corresponding to the second fingerprint image. The first fingerprint feature and the second fingerprint feature may have an equal dimensionality. Dimensionality reduction may be performed on the first fingerprint feature and the second fingerprint feature to respectively obtain a third fingerprint feature and a fourth fingerprint feature. As a result, the third fingerprint feature and the fourth fingerprint feature may have an equal dimensionality which is smaller than the dimensionality of the first fingerprint feature and the second fingerprint feature. A determination may be made as to whether the first fingerprint image and the second fingerprint image belong to a same fingerprint according to a cosine distance between the third fingerprint feature and the fourth fingerprint feature.

According to a second aspect of the present disclosure, a fingerprint recognition apparatus may include the following features. The finger print recognition apparatus may include a processor and a memory configured to store instructions executable by the processor. The processor may be configured to perform feature extraction on a first fingerprint image acquired by a fingerprint sensor and on a second fingerprint image that are stored in a database. The processor may use an auto encode decode network to obtain a first fingerprint feature corresponding to the first fingerprint image and a second fingerprint feature corresponding to the second fingerprint image. The first fingerprint feature and the second fingerprint feature may have an equal dimensionality. Dimensionality reduction may be performed by the processor on the first fingerprint feature and the second fingerprint feature to respectively obtain a third fingerprint feature and a fourth fingerprint feature. The third fingerprint feature and the fourth fingerprint feature have an equal dimensionality which may be smaller than the dimensionality of the first fingerprint feature and the second fingerprint feature. The processor may determine whether the first fingerprint image and the second fingerprint image belong to a same fingerprint according to a cosine distance between the third fingerprint feature and the fourth fingerprint feature.

According to a third aspect of the present disclosure, a non-transitory computer-readable storage medium may have stored thereon instructions that when executed by a processor of a terminal device, cause the terminal device to perform fingerprint recognition. The instructions may cause the terminal device to perform feature extraction on a first fingerprint image acquired by a fingerprint sensor and a second fingerprint image stored in a database. The instructions may cause the terminal device to use an auto encode decode network to obtain a first fingerprint feature corresponding to the first fingerprint image and a second fingerprint feature corresponding to the second fingerprint image. The first fingerprint feature and the second fingerprint feature may have an equal dimensionality. The instructions may cause the terminal device to perform dimensionality reduction on the first fingerprint feature and the second fingerprint feature to respectively obtain a third fingerprint feature and a fourth fingerprint feature. The third fingerprint feature and the fourth fingerprint feature may have an equal dimensionality that may be smaller than the dimensionality of the first fingerprint feature and the second fingerprint feature. The instructions may cause the terminal device to determine whether the first fingerprint image and the second fingerprint image belong to a same fingerprint according to a cosine distance between the third fingerprint feature and the fourth fingerprint feature.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments of the disclosure, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
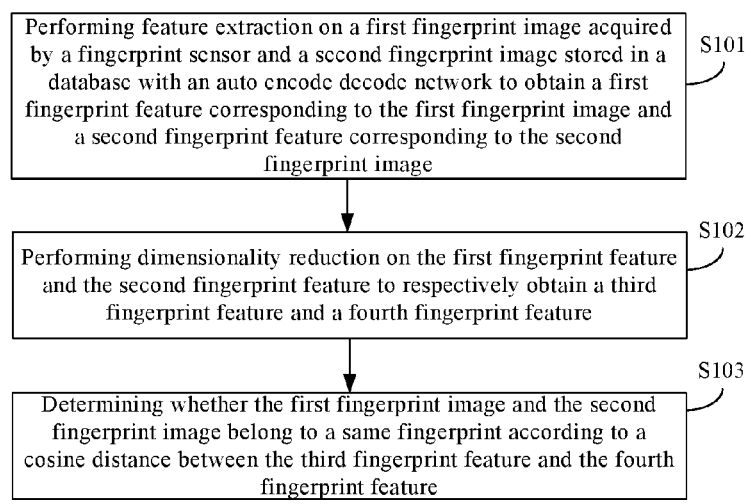
FIG. 1A is a flow chart illustrating exemplary steps for fingerprint recognition according to an embodiment of the disclosure.

FIG. 1A is a flowchart illustrating exemplary steps for fingerprint recognition according to an embodiment of the disclosure. Methods for fingerprint recognition may be applied to or performed by a fingerprint recognition device that may include a fingerprint sensor. A fingerprint sensor may be an electronic device that captures a digital image of a fingerprint pattern. For example, a smart mobile phone, a tablet computer or a fingerprint punch card machine may have a fingerprint sensor and fingerprint authentication functionality.

Referring to FIG. 1A, a method for fingerprint recognition may include the following steps S101-S103.

In Step S101, feature extraction may be performed on a first fingerprint image acquired by a fingerprint sensor and a second fingerprint image that may be retrieved from a database. An auto encode decode (AED) network may be used to obtain a first fingerprint feature corresponding to the first fingerprint image and a second fingerprint feature corresponding to the second fingerprint image. The first fingerprint feature and the second fingerprint feature may have equal dimensionality.

In some embodiments, fingerprint images of users may be acquired and stored in a database. For example, fingerprint images of all employees in Company A may be stored in a database. When a User B's fingerprint needs to be authenticated, a first fingerprint image may be acquired by a fingerprint sensor from User B. An auto encode decode network may include an encoding layer and a decoding layer. The first fingerprint image may be input into the encoding layer and the encoding layer may output an encoding feature of the first fingerprint image. The encoding feature may then be input into a decoding layer that may correspond to the encoding layer, and the decoding layer may output a first fingerprint feature of the first fingerprint image. Similarly, a second fingerprint feature corresponding to a second fingerprint image may be obtained in the same way as User B's first fingerprint feature was obtained using a second fingerprint image stored in the database.

In Step S102, dimensionality reduction may be performed on the first fingerprint feature and the second fingerprint feature to respectively obtain a third fingerprint feature and a fourth fingerprint feature. The third fingerprint feature and the fourth fingerprint feature may have an equal dimensionality that may be smaller than the dimensionality of the first fingerprint feature and the second fingerprint feature.

In an embodiment, dimensionality reduction may be performed on the first fingerprint feature and the second fingerprint feature using a trained linear discriminant analysis (LDA). For example, a fingerprint feature of an unlabeled fingerprint sample, having a first setting dimensionality may be extracted by using the trained AED network. LDA training may be performed on the fingerprint feature having the first setting dimensionality. In this way, a projection matrix having a second setting dimensionality of the LDA may be obtained. For example, an encoding feature representation parameter having the first setting dimensionality (e.g. 500 dimensions) may be output from the unlabeled fingerprint sample outputs via the AED network. After the LDA training, the dimensionality of the encoding feature representation parameter may be reduced, using the trained LDA to obtain the second setting dimensionality (e.g. 200 dimensions). In this way, a complexity in calculating a cosine distance may be reduced.

In Step S103, it may be determined whether the first fingerprint image and the second fingerprint image belong to a same fingerprint according to a cosine distance between the third fingerprint feature and the fourth fingerprint feature.

In an embodiment, the cosine distance between the third fingerprint feature and the fourth fingerprint feature may be compared with a preset threshold. It may be determined that the first fingerprint image and the second fingerprint image belong to the same fingerprint when the cosine distance is greater than the preset threshold. It may be determined that the first fingerprint image and the second fingerprint image belong to different fingerprints when the cosine distance is less than or equal to the preset threshold.

Figure 1B:
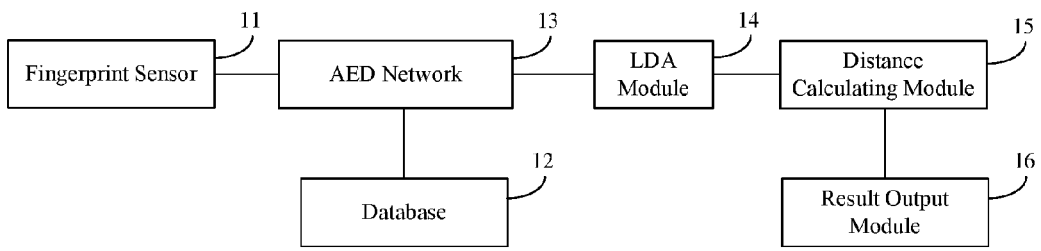
FIG. 1B is a schematic diagram illustrating an exemplary AED network according to an embodiment of the disclosure.

FIG. 1B is a schematic diagram illustrating an exemplary AED network according to an embodiment of the disclosure. Referring to FIG. 1B, there is shown a fingerprint sensor 11, an AED network 13 and LDA module 14, a distance calculating module 15, a result output module 16 and a database 12.

When User B requests a fingerprint authentication, a first fingerprint image of User B may be acquired by the fingerprint sensor 11. The first fingerprint image along with a second fingerprint image that may be retrieved from the database 12 may be input into the trained AED network 13. The AED network 13 may then output a first fingerprint feature corresponding to the first fingerprint image and a second fingerprint feature corresponding to the second fingerprint image. For example, both of the first fingerprint feature and the second fingerprint feature may be fingerprint features that have a dimensionality of 500. Dimensionality reduction may then be performed on the first fingerprint feature and the second fingerprint feature that each may have the 500 dimensions, using a projection matrix of the LDA module 14. For example, the dimensionalities of the first fingerprint feature and the second fingerprint feature may be reduced by the LDA module 14 from 500 to 200 dimensions. In other words, the LDA module 14 may output a third fingerprint feature obtained by reducing the dimensionality of the first fingerprint feature and a fourth fingerprint feature obtained by reducing the dimensionality of the second fingerprint feature. For example, both the third fingerprint feature and the fourth fingerprint feature may have 200 dimensions. The distance calculating module 15 may calculate a cosine distance between the third fingerprint feature and the fourth fingerprint feature having the 200 dimensions, and a result output module 16 may compare the cosine distance with a threshold distance. For example, the cosine distance may be divided based on the threshold. When the cosine distance is greater than the threshold, the result output module 16 may output a result indicating that the first fingerprint image and the second fingerprint image belong to the same fingerprint or person. When the cosine distance is less than or equal to the threshold, the result output module 16 may output a result indicating that the first fingerprint image and the second fingerprint image belong to different fingerprints or different people.

The AED network may obtain fingerprint features by training over many fingerprint images. Therefore, the first fingerprint feature corresponding to the first fingerprint image and the second fingerprint feature corresponding to the second fingerprint image that are extracted by the AED network may include a fingerprint feature that facilitates fingerprint recognition. This process avoids the problems encountered when performing fingerprint recognition using a global feature point and a local feature point of a fingerprint. When a fingerprint image is poor in quality and neither of the global and local feature points may be extracted, fingerprint recognition may still be implemented utilizing the AED network that may recognize a feature that facilitates the fingerprint recognition. In this manner, the accuracy and results in fingerprint recognition of low-quality fingerprint images is greatly improved. Also, the computational complexity for fingerprint recognition may be greatly reduced by performing the dimensionality reduction on the first fingerprint feature and the second fingerprint feature.

In some embodiments, an AED network may be trained. The AED network may include at least one encoding layer. An encoding feature parameter may be trained for each encoding layer of the AED network in the at least one encoding layer. An unlabeled fingerprint sample may be used to obtain the encoding feature representation parameter corresponding to each encoding layer. To obtain fingerprint reconstruction data using the unlabeled fingerprint sample, data reconstruction may be performed on an encoding feature representation parameter corresponding to each encoding layer using a decoding layer that corresponds to the encoding layer. The fingerprint reconstruction data and the unlabeled fingerprint sample may be compared to determine a reconstruction error. The encoding feature representation parameter corresponding to each encoding layer may be adjusted based on the reconstruction error. When the reconstruction error reaches a minimum value, the training of the AED network may be stopped, to obtain a first-time trained AED network.

In some embodiments, the last encoding layer of the first-time trained AED network may be connected with a classifier. A labeled fingerprint sample, comprising a categorical attribute indicating whom the fingerprint belongs to, may be input into the first-time trained AED network to obtain a first output result. The first output result may be input into the classifier, where the classifier may attempt to determine whom the fingerprint belongs to, and the classifier may be trained using the labeled fingerprint sample. The training of the classifier may be stopped when a reconstruction error between a result output by the classifier and the labeled fingerprint sample reaches a minimum value.

In some embodiments, the encoding feature representation parameter corresponding to the each encoding layer of the first-time trained AED network may be fine-tuned. In this regard, the last encoding layer of the first-time trained AED network may be connected with a classifier. A labeled fingerprint sample may be input into the first-time trained AED network to obtain a second output result. The second output result may be input into the classifier, thereby training the classifier using the labeled fingerprint sample and fine-tuning the encoding feature representation parameter corresponding to the each encoding layer of the first-time trained AED network. The training of the classifier and fine-tuning the encoding feature representation parameter corresponding to each encoding layer may be stopped when a reconstruction error between the result output by the classifier and the labeled fingerprint sample reaches a minimum value.

Furthermore, the encoding feature representation parameter having a first setting dimensionality of the unlabeled fingerprint sample may be extracted using the trained AED network. LDA training on the encoding feature representation parameter having the first setting dimensionality may be used to obtain a projection matrix having a second setting dimensionality of the LDA.

In some embodiments, determination of whether a first fingerprint image and a second fingerprint image belong to a same fingerprint based on a cosine distance between a third fingerprint feature and a fourth fingerprint feature may include the following steps. The cosine distance between the third fingerprint feature and the fourth fingerprint feature may be compared with a preset threshold. When the cosine distance is greater than the preset threshold, the first fingerprint image and the second fingerprint image may belong to the same fingerprint. When the cosine distance is less than or equal to the preset threshold, the first fingerprint image and the second fingerprint image may belong to different fingerprints.

According to the methods provided by the present disclosure, the problems encountered in other methods of fingerprint recognition may be avoided, for example, the failure of fingerprint recognition efforts that occur when global feature point and local feature point information is missing. Fingerprint recognition may still be implemented when fingerprint image quality is low and neither of global feature point and the local feature point information is available. The accuracy of fingerprint recognition for low-quality fingerprint images may be greatly improved and the computational complexity of fingerprint recognition may be reduced by utilizing the methods described herein.

Figure 2A:
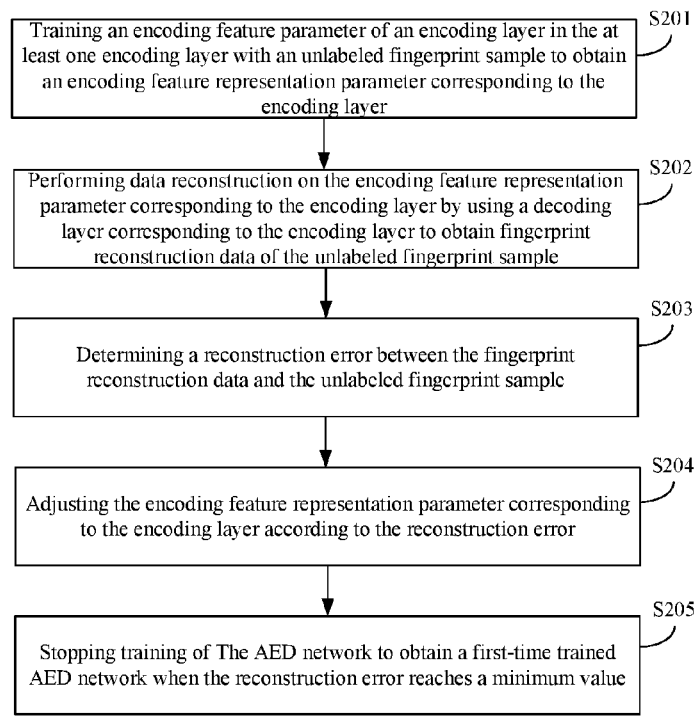
FIG. 2A is a flow chart illustrating exemplary steps for fingerprint recognition according to an embodiment of the disclosure.

FIG. 2A is a flow chart illustrating exemplary steps for fingerprint recognition according to an embodiment of the disclosure. Referring to FIG. 2A, exemplary steps for training an AED network and an LDA with an unlabeled fingerprint sample are provided. The exemplary steps include:

In Step S201, an encoding feature parameter of each encoding layer in at least one encoding layer of an AED network may be trained using the unlabeled fingerprint sample to obtain the encoding feature representation parameter corresponding to the each encoding layer.

In Step S202, data reconstruction may be performed on the encoding feature representation parameter corresponding to each of the encoding layers using a decoding layer corresponding to the encoding layer to generate fingerprint reconstruction data corresponding to the unlabeled fingerprint sample.

In Step S203, a reconstruction error between the fingerprint reconstruction data and the unlabeled fingerprint sample may be determined.

In Step S204, the encoding feature representation parameter corresponding to the each encoding layer may be adjusted according to the reconstruction error.

In Step S205, training of the AED network may be stopped when the reconstruction error reaches a minimum value.

Figure 2B:
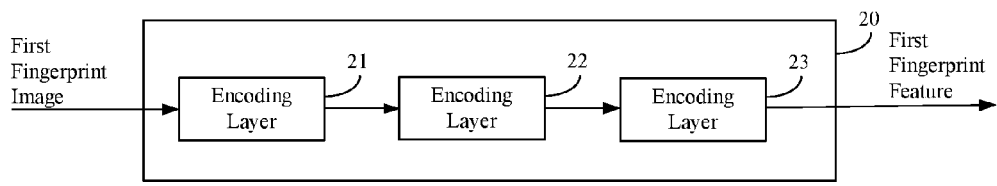
FIG. 2B is a schematic diagram illustrating an exemplary AED network according to an embodiment of the disclosure.

FIG. 2B is a schematic diagram illustrating an exemplary AED network according to an embodiment of the disclosure. The AED network may include at least one encoding layer. For example, the AED network 20 as shown in FIG. 2B includes three encoding layers, namely, the encoding layer 21, the encoding layer 22 and the encoding layer 23. When a feature is processed by an encoding layer the feature may be changed, for example, every time a feature is processed by an encoding layer, the feature may be reduced to a feature of fewer dimensions.

Figure 2C:
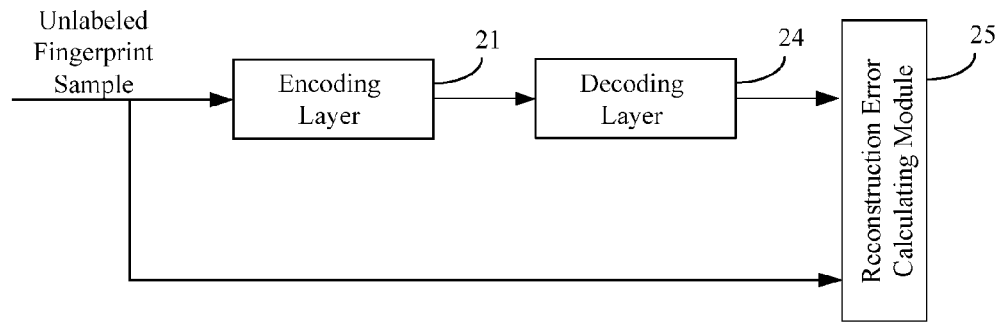
FIG. 2C is a schematic diagram illustrating how to train the AED network according to an embodiment of the disclosure.

FIG. 2C is a schematic diagram illustrating how to train the AED network according to an embodiment of the disclosure. Referring to FIG. 2C, an exemplary description is provided for training the encoding layer 21. Employing many unlabeled fingerprint samples, as an example, 600,000 unlabeled fingerprint samples, where each unlabeled fingerprint sample may be input into the encoding layer 21. As a result of inputting an unlabeled fingerprint sample, an encoding feature representation parameter of the unlabeled fingerprint sample may be obtained from the encoding layer 21. The encoding feature representation parameter serves as a representation of the input unlabeled fingerprint sample. In order to verify whether the encoding feature representation parameter is consistent with the unlabeled fingerprint sample, the encoding feature representation parameter may be input into a corresponding decoding layer 24 for reconstruction. A reconstruction error between output of the decoding layer 24 and the unlabeled fingerprint sample may be obtained through calculation of a reconstruction error by a calculating module 25. When a reconstruction error has not yet reached a minimum value, the encoding feature representation parameter of the encoding layer 21 may be adjusted based on the reconstruction error, and the process repeated until a minimum value is reached. At this point the encoding feature representation parameter may be utilized to represent the unlabeled fingerprint sample in the encoding layer 21.

Using a training process similar to the process described with respect to the encoding layer 21, encoding feature representation parameters respectively corresponding to the encoding layer 22 and the encoding layer 23 that are consistent with the unlabeled fingerprint sample may be determined using decoding layers corresponding respectively to the encoding layer 22 and the encoding layer 23, until the encoding layer 22 and the encoding layer 23 are trained to represent the unlabeled fingerprint sample, which is not expatiated in the present disclosure.

In operation, an AED network may be trained to encode a fingerprint image, and the fingerprint image may be represented by an encoding feature representation parameter. When the number of unlabeled fingerprint samples reaches a certain or adequate number, the trained AED network may be able to recognize a fingerprint image feature and enable fingerprint recognition, thereby avoiding a fingerprint recognition error caused by a failure in extraction of a global feature point and a local feature point from a low-quality fingerprint image.

Figure 3A:
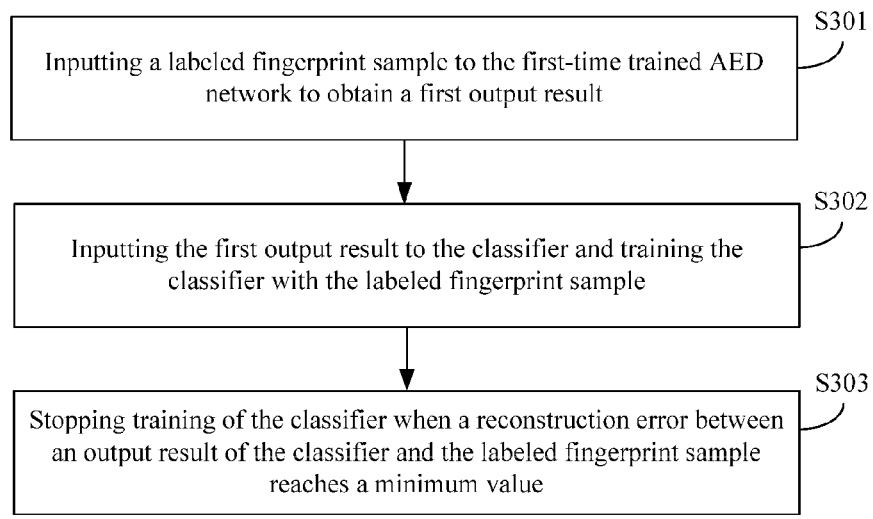
FIG. 3A is a flowchart illustrating how to fine-tune a parameter of the AED network with a labeled fingerprint sample according to an embodiment of the disclosure.

FIG. 3A is a flowchart illustrating how to fine-tune a parameter of the AED network by using a labeled fingerprint sample according to an exemplary embodiment.

Figure 3B:
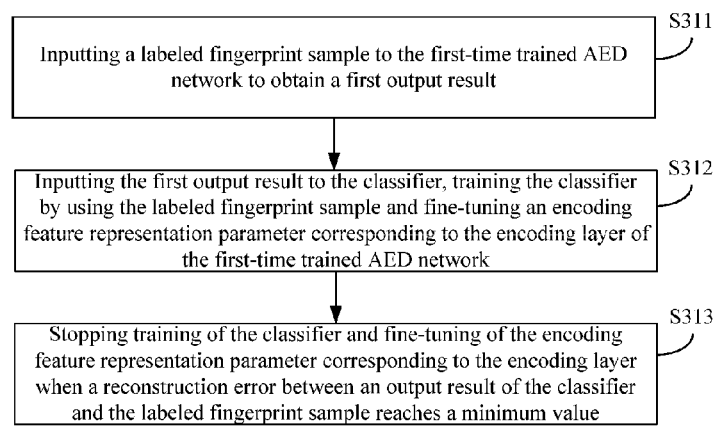
FIG. 3B is a flowchart of exemplary steps illustrating how to fine-tune a parameter of a classifier connected to the AED network with the labeled fingerprint sample according to an embodiment of the disclosure.

FIG. 3B is a flowchart illustrating how to fine-tune a parameter of a classifier connected to the AED network using the labeled fingerprint sample according to an exemplary embodiment of the disclosure.

Figure 3C:
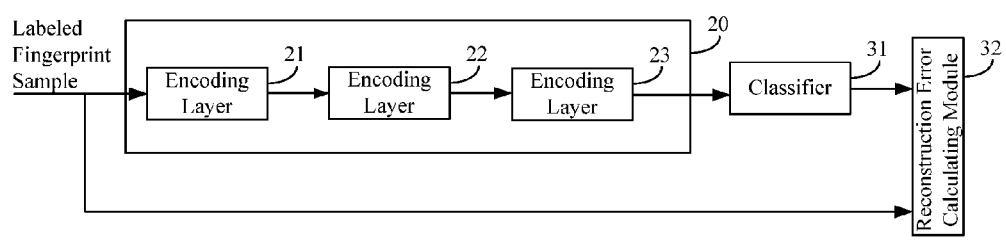
FIG. 3C is a schematic diagram illustrating an exemplary AED network and a classifier according to embodiment of the disclosure.

FIG. 3C is a schematic diagram illustrating the AED network and the classifier according to an exemplary embodiment of the disclosure.

Referring to FIG. 3A, a fingerprint recognition method may include the following steps.

In Step S301, a labeled fingerprint sample may be input into a first-time trained AED network to obtain a first output result.

In Step S302, the first output result may be input into a classifier and the classifier may be trained using the labeled fingerprint sample.

In Step S303, training of the classifier may be stopped when a reconstruction error between a result output by the classifier and the labeled fingerprint sample reaches a minimum value.

Referring to FIG. 3C, after the AED network is trained using the method described with respect to FIG. 2A, encoding feature representation parameters of multiple encoding layers, for example, the encoding layer 21, the encoding layer 22 and the encoding layer 23 of the AED network 20 shown in FIG. 3C may be acquired. Different expressions of an unlabeled fingerprint sample may be obtained from each encoding layer. Those skilled in the art may understand that the present disclosure does not limit the number of layers in the AED network.

In order to implement classification of the AED network 20, a classifier 31 may be additionally provided for an encoding layer, for example, the encoding layer 23 at the top layer of the AED network. The classifier 31 may be, for example, a logistic regression classifier or a support vector machine (SVM) classifier. The classifier 31 may trained using the first output result of the labeled fingerprint sample through a standard supervised training method, for example, gradient descent method, of a standard multi-layer neural network. The training of the classifier 31 may be stopped when a reconstruction error between a result output by the classifier and the labeled fingerprint sample reaches a minimum value, thereby implementing the classification function of the AED network 20. The reconstruction error may be calculated and obtained by a reconstruction error calculating module 32.

Referring to FIG. 3B, the fingerprint recognition method may further include the following steps.

In Step S311, a labeled fingerprint sample may be input to a first-time trained AED network to obtain a first output result.

In Step S312, the first output result may be input into a classifier, the classifier may be trained using the labeled fingerprint sample, and an encoding feature representation parameter corresponding to the each encoding layer of the first-time trained AED network may be fine-tuned.

In Step S313, training of the classifier and fine-tuning of the encoding feature representation parameter corresponding to the each encoding layer may be stopped when the reconstruction error between the result output by the classifier and the labeled fingerprint sample reaches a minimum value.

Similar to the description of FIG. 3A, the classifier 31 may be trained using the first output result of the labeled fingerprint sample through a standard supervised training method, for example, gradient descent method, of a standard multi-layer neural network. Moreover, encoding feature representation parameters corresponding to the encoding layer 21, the encoding layer 22 and the encoding layer 23 may be fine-tuned. The training of the classifier 31 may be stopped when a reconstruction error between a result output by the classifier and the labeled fingerprint sample, reaches the minimum value. The reconstruction error may be calculated and obtained by a reconstruction error calculating module 32. On the basis of implementing classification of the AED network 20, fine-tuning of the AED network 20 can also be implemented. When there is enough data of the labeled fingerprint sample, end-to-end learning can be achieved for the AED network, thereby improving the accuracy of fingerprint recognition for the AED network and the classifier.

Figure 4:
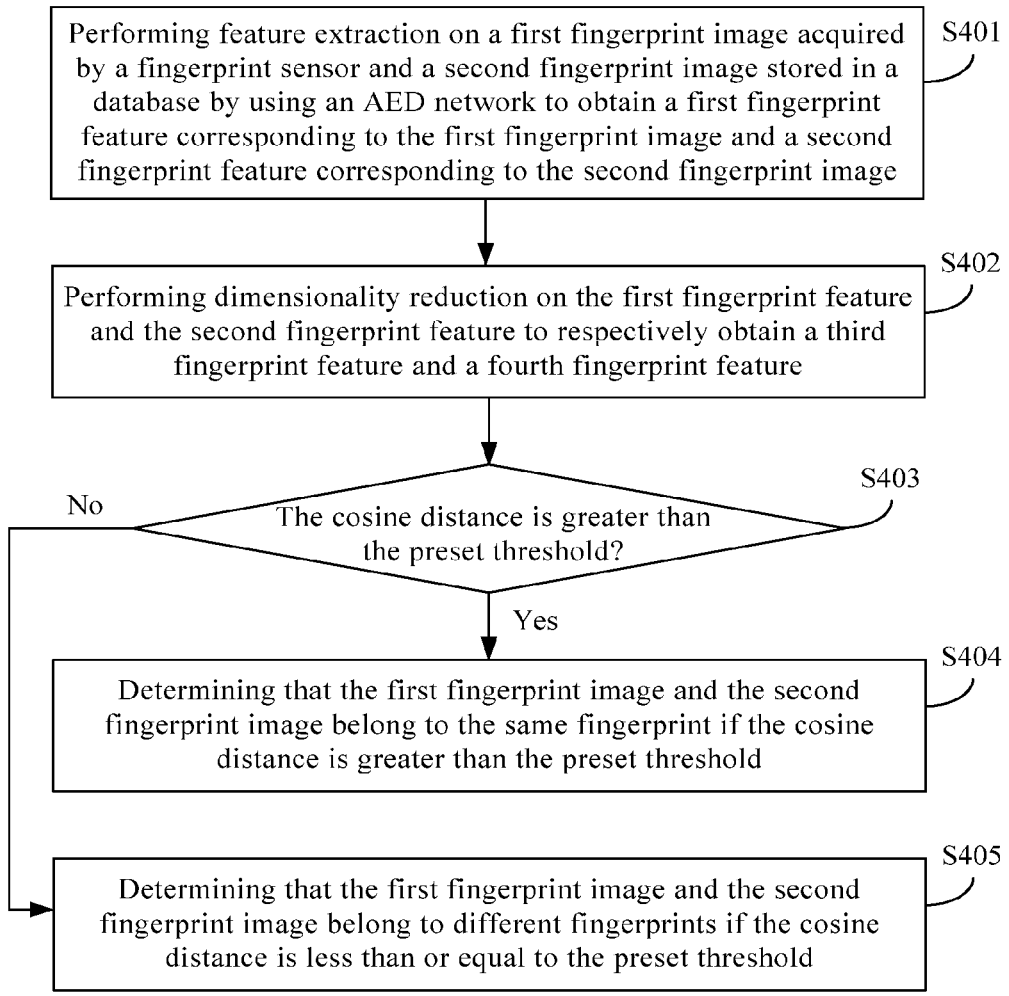
FIG. 4 is a flowchart illustrating exemplary steps for fingerprint recognition according to an embodiment of the disclosure.

FIG. 4 is a flowchart illustrating exemplary steps for fingerprint recognition according to an embodiment of the disclosure. Referring to FIG. 4, a method for conducting fingerprint recognition based cosine distance may include the following exemplary steps.

In Step S401, feature extraction may be performed on a first fingerprint image acquired by the fingerprint sensor and a second fingerprint image stored in a database using an AED network to obtain a first fingerprint feature corresponding to the first fingerprint image and a second fingerprint feature corresponding to the second fingerprint image, where the first fingerprint feature and the second fingerprint feature have equal dimensionality.

In Step S402, dimensionality reduction is performed on the first fingerprint feature and the second fingerprint feature to respectively obtain a third fingerprint feature and a fourth fingerprint feature, where the third fingerprint feature and the fourth fingerprint feature have equal dimensionality which may be smaller than the dimensionality of the first fingerprint feature and the second fingerprint feature.

Steps S401 and S402 are further described with respect to FIG. 1A, which is not repeated here.

In Step S403, the cosine distance between the third fingerprint feature and the fourth fingerprint feature is compared with a preset threshold. When the cosine distance is greater than the preset threshold the exemplary steps proceed to step S404. When the cosine distance is less than or equal to the preset threshold, the exemplary steps proceed to step S405.

In Step S404, it may be determined that the first fingerprint image and the second fingerprint image belong to a same fingerprint when the cosine distance is greater than the preset threshold.

In Step S405, it may be determined that the first fingerprint image and the second fingerprint image belong to different fingerprints when the cosine distance is less than or equal to the preset threshold.

In Step S403, an appropriate preset threshold may be obtained by training a large number of fingerprint samples from a sample database, and the preset threshold may be a recognition error rate acceptable to the user. For example, when there are 100 thousand pairs of within-class samples and one million of between-class samples in the sample database, in order to ensure that the recognition error rate is within one thousandth, a value between 0 and 1 may be obtained by calculating the cosine distance of each pair of samples. In this regard, the number of cosine distance values of the within-class samples is 100 thousand, and the number of cosine distance values of the between-class samples is one million, therefore, 1.1 million cosine distance values are obtained. An appropriate preset threshold can be thus determined using the 1.1 million cosine distance values with reference to the recognition error rate.

In addition to the advantageous technical effects of the foregoing embodiments, in this embodiment, a fingerprint may be recognized based on the cosine distance between the third fingerprint feature and the fourth fingerprint feature. The preset threshold may be obtained by training a large number of fingerprint samples with reference to a recognition error rate acceptable to the user. Therefore, user experience with a fingerprint recognition product may be improved to a certain extent.

Figure 5:
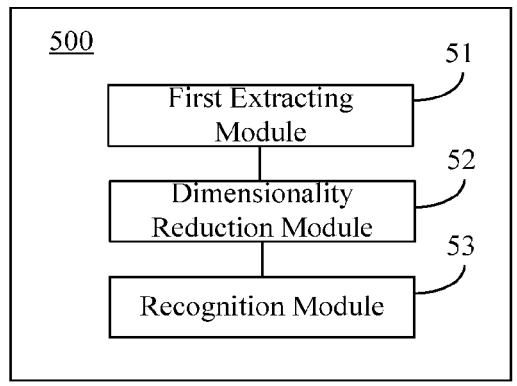
FIG. 5 is a block diagram illustrating an exemplary fingerprint recognition apparatus according to an embodiment of the disclosure.

FIG. 5 is a block diagram illustrating an exemplary fingerprint recognition apparatus according to an embodiment of the disclosure. Referring to FIG. 5, a fingerprint recognition apparatus 500 may include a first extracting module 51, a dimensionality module 52 and a recognition module 53.

The first extracting module 51 may be configured to perform feature extraction on a first fingerprint image acquired by a fingerprint sensor and a second fingerprint image stored in a database using an AED network to obtain a first fingerprint feature corresponding to the first fingerprint image and a second fingerprint feature corresponding to the second fingerprint image. The first fingerprint feature and the second fingerprint feature have an equal dimensionality. The AED network may include, for example, the AED network described with respect to FIGS. 1B, 2B, 2C and 3C.

The dimensionality reduction module 52 may be configured to perform dimensionality reduction processing on the first fingerprint feature and the second fingerprint feature that are extracted by the first extracting module 51. The dimensionality reduction process may produce a third fingerprint feature and a fourth fingerprint feature respectively, where the third fingerprint feature and the fourth fingerprint feature may have equal dimensionality, which may be smaller than the dimensionality of the first fingerprint feature and the second fingerprint feature.

The recognition module 53 may be configured to determine whether the first fingerprint image and the second fingerprint image belong to a same fingerprint according to a cosine distance between the third fingerprint feature and the fourth fingerprint feature obtained through the dimensionality reduction performed by the dimensionality reduction module 52.

Figure 6:
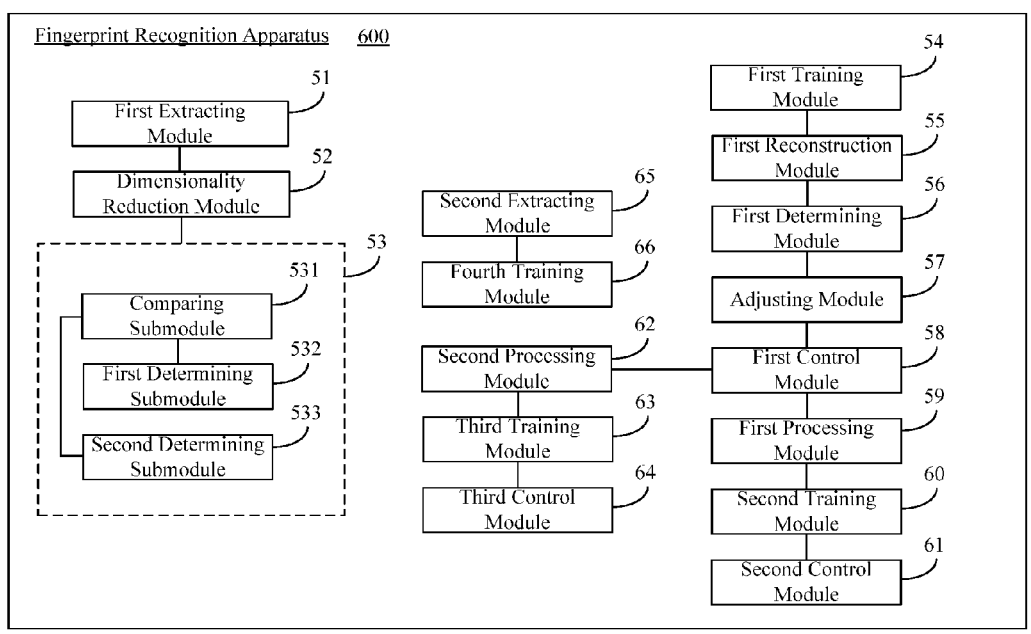
FIG. 6 is a block diagram illustrating an exemplary fingerprint recognition apparatus according to an embodiment of the disclosure.

FIG. 6 is a block diagram illustrating an exemplary fingerprint recognition apparatus according to an embodiment of the disclosure. Referring to FIG. 6, a fingerprint recognition apparatus 600 may include the first extraction module 51, the dimensionality reduction module 52 and the recognition module 53 described with respect to FIG. 5. The recognition module 53 may include a comparing submodule 531, a first determining submodule 532 and a second determining submodule 533. The fingerprint recognition apparatus 600 may also include a second extracting module 65, a fourth training module 66, a second processing module 62, a third training module 63, a third control module 64, a first training module 54, a first reconstruction module 55, a first determining module 56, an adjusting module 57, a first control module 58, a first processing module 59, a second training module 60 and a second control module 61.

The AED network referred to with respect to FIG. 5 may include at least one encoding layer. The first training module 54 may be configured to train an encoding feature parameter for each encoding layer in the at least one encoding layer using an unlabeled fingerprint sample to obtain an encoding feature representation parameter corresponding to each encoding layer.

The first reconstruction module 55 may be configured to perform data reconstruction on the encoding feature representation parameter corresponding to each encoding layer, obtained by training the first training module 54, to obtain fingerprint reconstruction data of the unlabeled fingerprint sample using a decoding layer corresponding to the encoding layer.

The first determining module 56 may be configured to determine a reconstruction error between the fingerprint reconstruction data determined by the first reconstruction module 55 and the unlabeled fingerprint sample.

The adjusting module 57 may be configured to adjust the encoding feature representation parameter corresponding to the each encoding layer according to the reconstruction error determined by the first determining module 56.

The first control module 58 may be configured to stop training the AED network to obtain a first-time trained AED network, when the reconstruction error determined by the first determining module 57 reaches a minimum value.

In some embodiments, a last encoding layer of the first-time trained AED network may be connected with a classifier, for example, the classifier 31 described with respect to FIG. 3C.

The first processing module 59 may be configured to input a labeled fingerprint sample to the first-time trained AED network to obtain a first output result.

The second training module 60 may be configured to input the first output result obtained by the first processing module 59 into the classifier and train the classifier using the labeled fingerprint sample.

The second control module 61 may be configured to control the second training module 60 to stop training the classifier when a reconstruction error between a result output by the classifier and the labeled fingerprint sample reaches a minimum value.

In some embodiments, the last encoding layer of the first-time trained AED network may be connected with a classifier for example, the classifier 31 described with respect to FIG. 3C.

The second processing module 62 may be configured to input the labeled fingerprint sample to the first-time trained AED network to obtain a second output result.

The third training module 63 may be configured to input the second output result obtained by the second processing module 62 into the classifier, train the classifier using the labeled fingerprint sample and fine-tune the encoding feature representation parameter corresponding to each encoding layer of the first-time trained AED network.

The third control module 64 may be configured to control the third training module 63 to stop training the classifier and fine-tuning the encoding feature representation parameter corresponding to the each encoding layer when the reconstruction error between the result output by the classifier and the labeled fingerprint sample reaches a minimum value.

In some embodiments, the second extracting module 65 may be configured to extract an encoding feature representation parameter having the first setting dimensionality of the unlabeled fingerprint sample, using the trained AED network.

The fourth training module 66 may be configured to perform LDA training on the encoding feature representation parameter having the first setting dimensionality extracted by the second extracting module 65 to obtain a projection matrix having the second setting dimensionality of the LDA.

In some embodiments, the recognition module 53 may include a comparing submodule 531 that may be configured to compare a cosine distance between the third fingerprint feature and the fourth fingerprint feature with a preset threshold.

The first determining submodule 532 may be configured to determine that the first fingerprint image and the second fingerprint image belong to a same fingerprint when a comparative result obtained by the comparing submodule 531 indicates that the cosine distance is greater than the preset threshold.

The second determining submodule 533 may be configured to determine that the first fingerprint image and the second fingerprint image belong to different fingerprints when the comparative result obtained by the comparing submodule 531 indicates that the cosine distance is less than or equal to the preset threshold.

Additional specific operations of the apparatuses 500, 600 and 700 have been described with respect to FIGS. 1A-4 and thus are not elaborated here.

Figure 7:
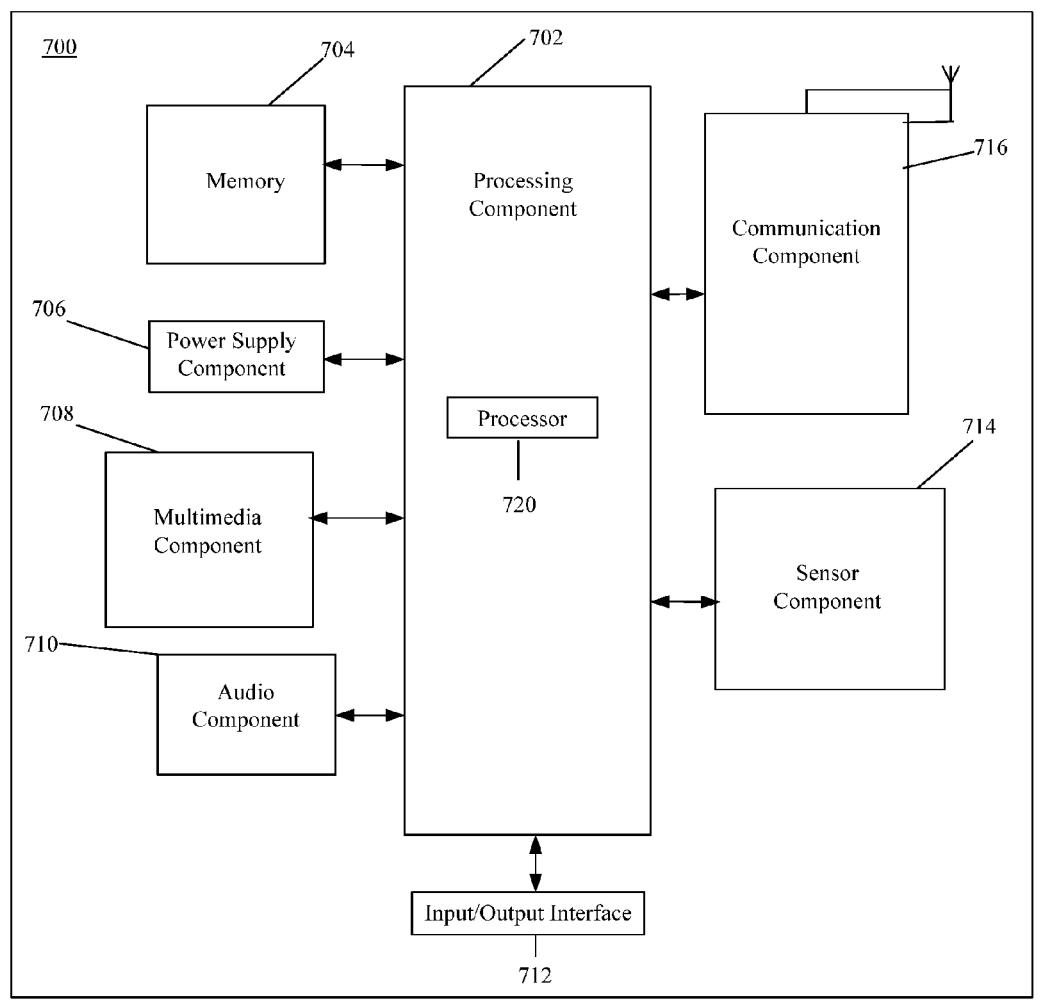
FIG. 7 is a block diagram illustrating an exemplary fingerprint recognition device according to an embodiment of the disclosure.

FIG. 7 is a block diagram illustrating an exemplary fingerprint recognition device according to an embodiment of the disclosure. The apparatus 700 may be operable to perform fingerprint recognition according the embodiments of this disclosure the apparatus 700 and may be, for example, a mobile telephone, a computer, a digital broadcasting terminal, a message transceiver device, a games console, a tablet device, a medical device, a security system device, a fitness facility, a personal digital assistant and the like.

Referring to FIG. 7, the apparatus 700 may include one or more components including a processing component 702, a memory 704, a power supply component 706, a multimedia component 708, an audio component 710, an input/output (I/O) interface 712, a sensor component 714 and a communications component 716.

The processing component 702 may control overall operations of the apparatus 700, for example, operations associated with finger print recognition processors, finger print sensor input, system security; multimedia systems, image display, telephone operations, data communications, camera systems and recording systems. The processing component 702 may include one or more processors 720 for executing instructions to complete the steps of the foregoing method in part or in whole. In addition, the processing component 702 may include one or more modules for the convenience of interaction between the processing component 702 and other components. For example, the processing component 702 may include a multimedia module for the convenience of interaction between the multimedia component 708 and the processing component 702.

The memory 704 may be configured to store various types of data so as to support the operation of the apparatus 700. Examples of the data include instructions for fingerprint recognition including the steps set forth herein, any application program or method executed by the apparatus 700, labelled and unlabeled fingerprint samples, fingerprint recognition modules output, contact data, phonebook data, a message, a picture and a video, etc. The memory 704 may be implemented by volatile or non-volatile memory device or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power supply component 706 may provide power for various components of the apparatus 700. The power supply component 706 may include a power management system, one or more power supplies, and other components associated with generation, management and power distribution of the apparatus 700.

The multimedia component 708 may include a screen between the apparatus 700 and a user for providing an interface for finger recognition input and/or output. In some embodiments, the screen may include a liquid crystal display (LCD) and a touch panel (TP). If the screen includes a touch panel, the screen may be implemented as a touch screen for receiving an input signal from the user. The touch panel includes one or more touch sensors for sensing a touch, slide and gestures on the touch panel. The touch sensor may not only sense a boundary of a touch or slide, but also detect the time duration and pressure related to the touch or slide operation. In some embodiments, the multimedia component 708 may include a front-facing camera and/or a rear-facing camera. When the apparatus 700 is in an operation mode, for example, a shooting mode or a video mode, the front-facing camera and/or the rear-facing camera may receive external multimedia data. Each front-facing camera and rear-facing camera may be a fixed optical lens system or have a focal length and optical zoom capacity.

The audio component 710 may be configured to output and/or input an audio signal. For example, the audio component 710 may include a microphone (MIC). When the apparatus 700 is in an operation mode such as a fingerprint sensor mode, call mode, a record mode and a speech recognition mode, the microphone may be configured to receive an external audio signal. The received audio signal may be further stored in the memory 704 or sent out by the communications component 716. In some embodiments, the audio component 710 may also include a loudspeaker for outputting the audio signal.

The I/O interface 712 provides an interface for the processing component 702 and a peripheral interface module, and the peripheral interface module may be a fingerprint sensor, a keyboard, a click wheel and buttons, etc. These buttons may include but are not limited to: a home button, a volume button, a start button and a lock button.

The sensor component 714 may include a fingerprint sensor that may capture digital images of fingerprint patterns. The captured images may be utilized in fingerprint recognition in accordance with various embodiment of the present disclosure and may be referred to as biometric data. Any suitable fingerprint sensing technology may be utilized, for example, optical, capacitive, RF, thermal, piezoresistive, ultrasonic, piezoelectric or MEMS. However, the disclosure is not limited to any specific type of fingerprint sensing technology.

Alternatively, the sensor component 714 may include one or more sensors for providing the apparatus 700 with a state evaluation from all aspects. For example, the sensor component 714 may detect the on/off state of the apparatus 700, relative positioning of components, for example, the components are the displayer and keypads of the apparatus 700; the sensor component 714 also may detect the position change of the apparatus 700 or a component thereof, the presence or absence of the user's touch on the apparatus 700, the direction or acceleration/deceleration of the apparatus 700, and temperature variation of the apparatus 700. The sensor component 714 may also include a proximity detector, which is configured to detect the presence of a nearby object in case of no physical contact. The sensor component 714 may also include an optical sensor, for example, a CMOS or CCD image sensor, used in the application of imaging. In some embodiments, the sensor component 714 may also include an acceleration sensor, a gyro sensor, a magnetic sensor, a pressure sensor, or a temperature sensor.

The communications component 716 may be configured to facilitate wired or wireless communications between the apparatus 700 and other devices. The apparatus 700 may be available for access to a wireless network based on communications standards, for example, Wi-Fi, 2G or 3G, 4G or a combination thereof. In an exemplary embodiment, the communications component 716 may receive, by means of a broadcast channel, a broadcast signal or broadcast-related information from an external broadcast management system. In an exemplary embodiment, the communications component 716 also includes a near field communication (NFC) module to promote short-range communications. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In an exemplary embodiment, the apparatus 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing method.

In an exemplary embodiment, a non-transitory computer-readable storage medium including instructions may be provided, for example, a memory 704 may include the instructions, and the instructions may be executed by the processor 720 of the apparatus 700 to achieve the foregoing methods of fingerprint recognition. For example, the non-transitory computer-readable storage medium may be a ROM, a random access memory (RAM), a CD-ROM, a magnetic tape, a floppy disk and an optical data memory device, etc.

Other embodiments of the present disclosure will be apparent to those skilled in the art from consideration of the specification and practice of the invention disclosed herein. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

Each module or unit discussed above for FIGS. 5-7, for example, the first extracting module 51, the dimensionality module 52, the recognition module 53, the comparing submodule 531, the first determining submodule 532 the second determining submodule 533, the second extracting module 65, the fourth training module 66, the second processing module 62, the third training module 63, the third control module 64, the first training module 54, the first reconstruction module 55, the first determining module 56, the adjusting module 57, the first control module 58, the first processing module 59, the second training module 60 and the second control module 61 may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

We claim:

1. A fingerprint recognition method, the method comprising:
    retrieving, by a fingerprint recognition device comprising a memory and a processor in communication with the memory, a first fingerprint image acquired by a fingerprint sensor and a second fingerprint image stored in a database;
    performing, by the fingerprint recognition device, feature extraction on the first fingerprint image and the second fingerprint image with an auto encode decode network to obtain a first fingerprint feature corresponding to the first fingerprint image and a second fingerprint feature corresponding to the second fingerprint image, the first fingerprint feature and the second fingerprint feature having equal dimensionality;
    performing, by the fingerprint recognition device, dimensionality reduction on the first fingerprint feature and the second fingerprint feature to respectively obtain a third fingerprint feature and a fourth fingerprint feature, the third fingerprint feature and the fourth fingerprint feature having equal dimensionality that is smaller than the dimensionality of the first fingerprint feature and the second fingerprint feature;
    calculating, by the fingerprint recognition device, a cosine distance between the third fingerprint feature and the fourth fingerprint feature;
    comparing, by the fingerprint recognition device, the calculated cosine distance with a preset threshold;
    when the cosine distance is greater than the preset threshold, determining, by the fingerprint recognition device, that the first fingerprint image and the second fingerprint image belong to the same fingerprint; and
    when the cosine distance is less than or equal to the preset threshold, determining, by the fingerprint recognition device, that the first fingerprint image and the second fingerprint image belong to different fingerprints.

2. The method of claim 1, wherein the auto encode decode network comprises at least one encoding layer, and the method further comprises:
    training the auto encode decode network by:
    training an encoding feature parameter for each encoding layer in the at least one encoding layer with an unlabeled fingerprint sample to obtain an encoding feature representation parameter corresponding to each encoding layer;
    performing a data reconstruction on the encoding feature representation parameter corresponding to each encoding layer to obtain fingerprint reconstruction data of the unlabeled fingerprint sample using a decoding layer corresponding to each respective encoding layer;
    determining a reconstruction error between the fingerprint reconstruction data and the unlabeled fingerprint sample; and
    adjusting the encoding feature representation parameter corresponding to each encoding layer according to the reconstruction error; and
    stopping training of the auto encode decode network when the reconstruction error reaches a minimum value for each encoding layer, to obtain a trained auto encode decode network.

3. The method of claim 2, wherein a last encoding layer of the trained auto encode decode network is connected with a classifier, and the method further comprises:
    inputting a labeled fingerprint sample into the trained auto encode decode network to obtain a first output result;
    inputting the first output result to the classifier and training the classifier with the labeled fingerprint sample; and
    stopping training the classifier when a reconstruction error between an output result of the classifier and the labeled fingerprint sample reaches a minimum value.

4. The method of claim 2, wherein a last encoding layer of the trained auto encode decode network is connected with a classifier, and the method further comprises:
    inputting a labeled fingerprint sample to the trained auto encode decode network to obtain a second output result;
    inputting the second output result to the classifier, training the classifier with the labeled fingerprint sample and fine-tuning the encoding feature representation parameter corresponding to the encoding layer of the trained auto encode decode network; and
    stopping training of the classifier and the fine-tuning of the encoding feature representation parameter corresponding to the encoding layer when a reconstruction error between an output result of the classifier and the labeled fingerprint sample reaches a minimum value.

5. The method of claim 2, further comprising:
    extracting an encoding feature representation parameter having a first setting dimensionality of the unlabeled fingerprint sample with the trained auto encode decode network; and
    performing linear discriminant analysis LDA training on the encoding feature representation parameter having the first setting dimensionality to obtain a projection matrix having a second setting dimensionality of the LDA.

6. A fingerprint recognition apparatus, comprising:
    a processor; and
    a non-transitory computer-readable medium configured to store instructions executable by the processor, wherein, the processor, when executing the instructions, is configured to cause the fingerprint recognition apparatus to:

retrieve a first fingerprint image acquired by a fingerprint sensor and a second fingerprint image stored in a database;

perform feature extraction on a first fingerprint image and the second fingerprint image with an auto encode decode network to obtain a first fingerprint feature corresponding to the first fingerprint image and a second fingerprint feature corresponding to the second fingerprint image, the first fingerprint feature and the second fingerprint feature having equal dimensionality;

perform dimensionality reduction on the first fingerprint feature and the second fingerprint feature to respectively obtain a third fingerprint feature and a fourth fingerprint feature, the third fingerprint feature and the fourth fingerprint feature having equal dimensionality that is smaller than the dimensionality of the first fingerprint feature and the second fingerprint feature;

calculate a cosine distance between the third fingerprint feature and the fourth fingerprint feature;

compare the calculated cosine distance with a preset threshold;

when the cosine distance is greater than the preset threshold, determine that the first fingerprint image and the second fingerprint image belong to the same fingerprint; and when the cosine distance is less than or equal to the preset threshold, determine that the first fingerprint image and the second fingerprint image belong to different fingerprints.

7. The apparatus of claim 6, wherein the auto encode decode network comprises at least one encoding layer, and the processor when executing the instructions is further configured to:

train the auto encode decode network, and the processor is further configured to:

train an encoding feature parameter for each encoding layer in the at least one encoding layer with an unlabeled fingerprint sample to obtain an encoding feature representation parameter corresponding to each encoding layer;

perform a data reconstruction on the encoding feature representation parameter corresponding to each encoding layer to obtain fingerprint reconstruction data of the unlabeled fingerprint sample through a decoding layer corresponding to each respective encoding layer;

determine a reconstruction error between the fingerprint reconstruction data and the unlabeled fingerprint sample; and adjust the encoding feature representation parameter corresponding to the encoding layer according to the reconstruction error; and stop training the auto encode decode network, when the reconstruction error reaches a minimum value, to obtain a trained auto encode decode network.

8. The apparatus of claim 7, wherein a last encoding layer of the trained auto encode decode network is connected with a classifier, and the processor when executing the instructions is further configured to:

input a labeled fingerprint sample to the trained auto encode decode network to obtain a first output result;

input the first output result to the classifier and train the classifier with the labeled fingerprint sample; and stop training the classifier when a reconstruction error between an output result of the classifier and the labeled fingerprint sample reaches a minimum value.

9. The apparatus of claim 7, wherein a last encoding layer of the trained auto encode decode network is connected with a classifier, and the processor when executing the instructions is further configured to:

input a labeled fingerprint sample to the trained auto encode decode network to obtain a second output result;

input the second output result to the classifier, train the classifier with the labeled fingerprint sample and fine-tune the encoding feature representation parameter corresponding to the encoding layer of the trained auto encode decode network; and stop the training of the classifier and the fine-tuning of the encoding feature representation parameter corresponding to the encoding layer when a reconstruction error between an output result of the classifier and the labeled fingerprint sample reaches a minimum value.

10. The apparatus of claim 7, wherein the processor when executing the instructions is further configured to:

extract an encoding feature representation parameter having a first setting dimensionality of the unlabeled fingerprint sample with the trained auto encode decode network; and perform linear discriminant analysis (LDA) training on the encoding feature representation parameter having the first setting dimensionality to obtain a projection matrix having a second setting dimensionality of the LDA.

11. A non-transitory computer-readable storage medium having stored thereon instructions, wherein the instructions, when executed by a processor of a terminal device, are configured to cause the terminal device to:

retrieve a first fingerprint image acquired by a fingerprint sensor and a second fingerprint image stored in a database;

perform feature extraction on the first fingerprint image and the second fingerprint image with an auto encode decode network to obtain a first fingerprint feature corresponding to the first fingerprint image and a second fingerprint feature corresponding to the second fingerprint image, the first fingerprint feature and the second fingerprint feature having equal dimensionality;

perform dimensionality reduction on the first fingerprint feature and the second fingerprint feature to respectively obtain a third fingerprint feature and a fourth fingerprint feature, the third fingerprint feature and the fourth fingerprint feature having an equal dimensionality smaller than the dimensionality of the first fingerprint feature and the second fingerprint feature;

calculate a cosine distance between the third fingerprint feature and the fourth fingerprint feature;

compare the calculated cosine distance with a preset threshold;

when the cosine distance is greater than the preset threshold, determine that the first fingerprint image and the second fingerprint image belong to the same fingerprint; and when the cosine distance is less than or equal to the preset threshold, determine that the first fingerprint image and the second fingerprint image belong to different fingerprints.

* * * * *